United States Patent [19]

Bulman

[11] Patent Number: 5,220,787
[45] Date of Patent: Jun. 22, 1993

[54] SCRAMJET INJECTOR

[75] Inventor: Melvin J. Bulman, Folsom, Calif.

[73] Assignee: Aerojet-General Corporation, Rancho Cordova, Calif.

[21] Appl. No.: 692,440

[22] Filed: Apr. 29, 1991

[51] Int. Cl.$^5$ .............................................. F02K 7/08
[52] U.S. Cl. ...................................... 60/270.1; 60/740
[58] Field of Search .................... 60/270.1, 740, 742, 60/743, 746

[56] References Cited

U.S. PATENT DOCUMENTS

| | | | |
|---|---|---|---|
| 3,334,485 | 8/1967 | Rhodes et al. | 60/270.1 |
| 4,291,533 | 9/1981 | Dugger et al. | 60/270.1 |
| 4,903,480 | 2/1990 | Lee et al. | 60/740 |

Primary Examiner—Richard A. Bertsch
Assistant Examiner—William Wicker
Attorney, Agent, or Firm—Townsend and Townsend; Khourie and Crew

[57] ABSTRACT

A scramjet fuel injector of the type mounted flush to the wall of a combustor through which air flows is provided. The injector includes a generally elongated body including a surface substantially flush with the wall, the surface having a proximate end and a distal end, the proximate end encountering air into which the fuel is to be injected before the distal end. The fuel injector further includes at least one fuel inlet port connected to the body, at least one fuel exit port in the surface substantially flush with the wall, and at least one throat internal to the body through which fuel serially passes after passing through the inlet ports and before passing through the exit ports. This arrangement of the fuel exit ports and throats combine to create and maintain a substantially streamlined supersonic fuel jet plume shape having exit pressure locally matched with the flowing air.

9 Claims, 11 Drawing Sheets

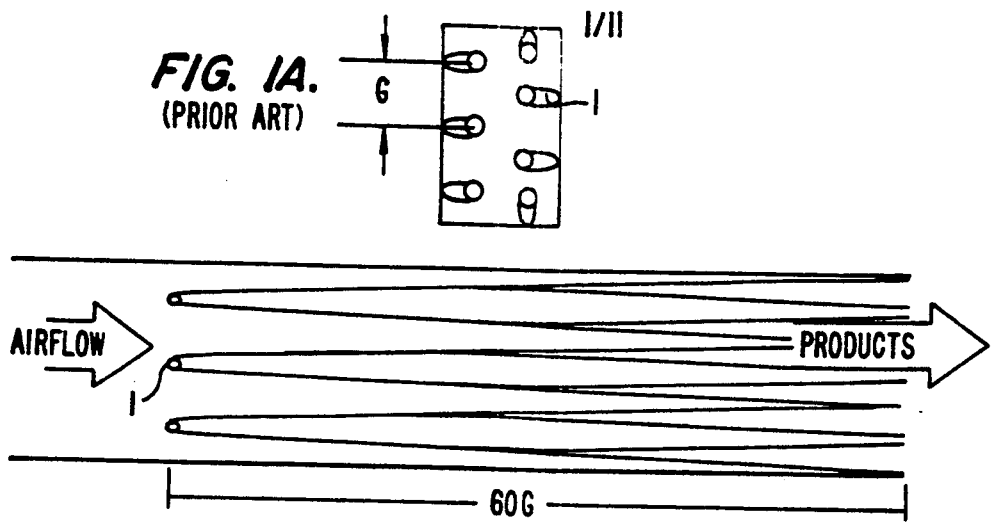
FIG. 1A. (PRIOR ART)
FIG. 1B (PRIOR ART)
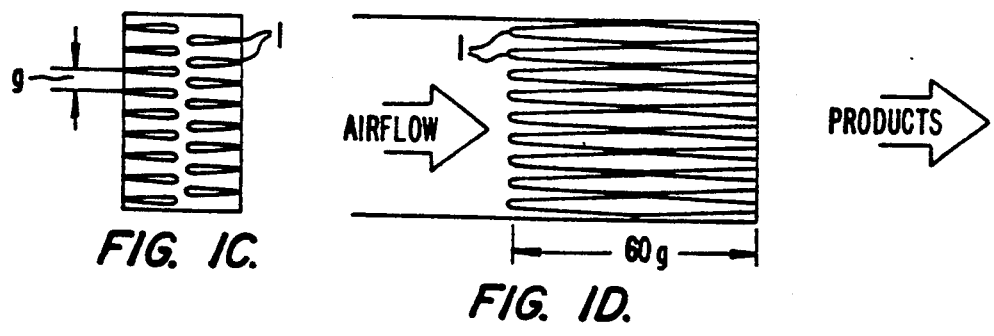
FIG. 1C.
FIG. 1D.
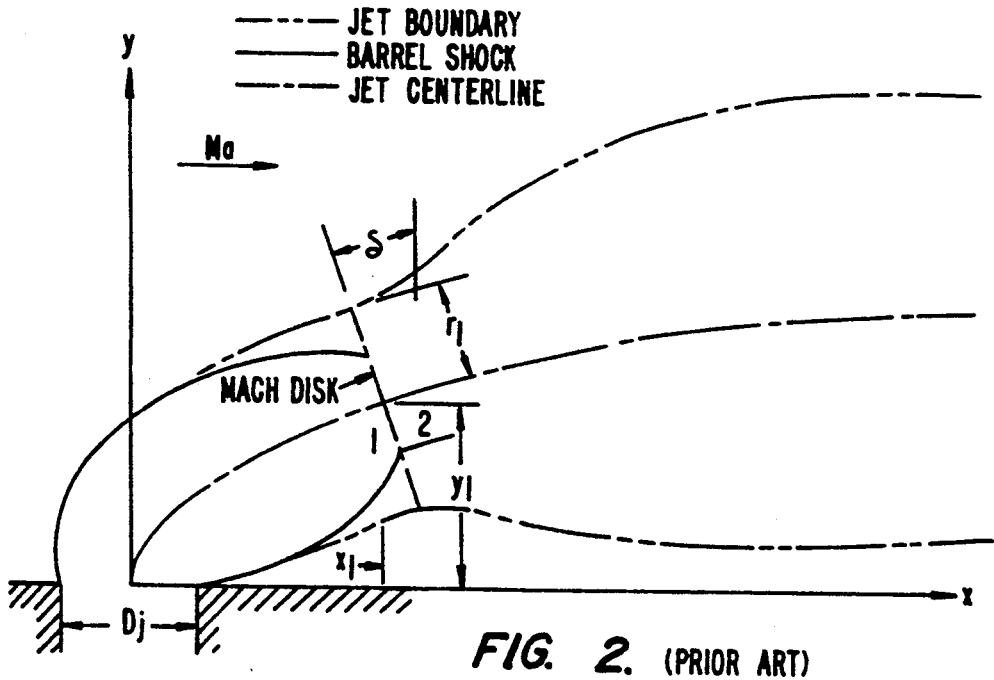
FIG. 2. (PRIOR ART)

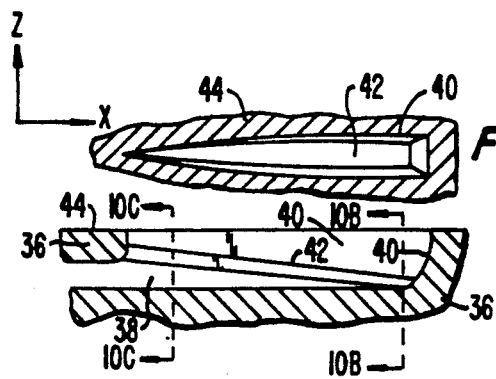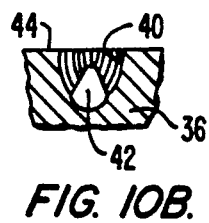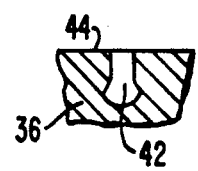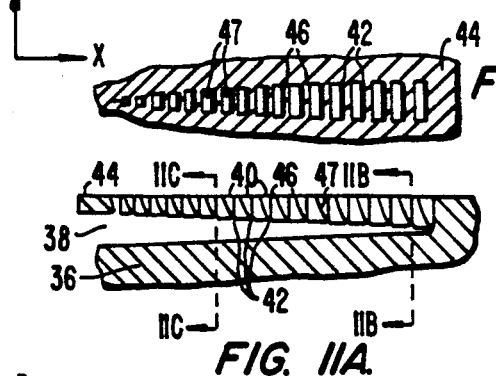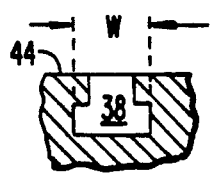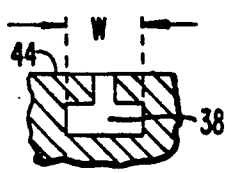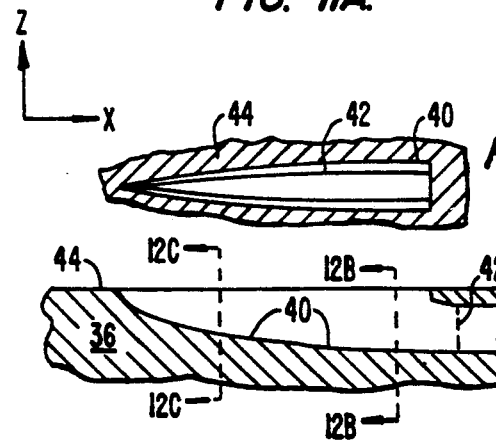

SCRAMJET INJECTOR

BACKGROUND OF THE INVENTION

The present invention relates generally to fuel mixing and combustion in a fluid stream. In particular, this invention relates to apparatus for injecting fuel into a high speed fluid stream to increase mixing and combustion efficiency of the fuel.

In many arts it is necessary to inject a fuel into a fluid, for example, air, in a manner that will promote mixing and combustion of the fuel in a commercially acceptable period of time and space. If the air stream is moving relative to the point of injection of the fuel, a persistent problem occurs in that the fuel may not properly penetrate the air stream a distance sufficient for the fuel to mix with the air by the time the air stream leaves the combustion chamber. In supersonic combustion ramjets (scramjets) where the fuel must be injected into a supersonic airstream, the problem becomes critical in that mixing and combustion of the fuel and air must occur extremely rapidly to achieve efficient operation, i.e., before the fuel leaves the combustion chamber.

A second problem with fuel combustion in jet propulsion devices, and in particular scramjets, is that operating at such high velocities makes the engine extremely sensitive to component efficiency. For example, if the inlet air stream loses an additional 1% of the available kinetic energy (kinetic energy efficiency goes from 98% to 97%) it is very likely that the engine would cease to produce useful thrust. Any component that introduces losses in the combustion process can quickly degrade the ability of the engine to produce thrust. Therefore, the manner of introducing the fuel into the air stream is extremely important.

Fuel injection schemes have been developed which address these problems, but fall short of producing adequate results. The most obvious method to get more fuel into the air stream was to simply pump much greater amounts of pressurized fuel into the air stream from the side in the manner of a large orifice. However, air/fuel mixing is not well served by having a few large injectors because the result is a large over fueled region surrounded by underfueled air.

If limited to injecting fuel from a wall of the combustor to penetrate the air stream, one solution is to have injectors on all sides so that injector penetrates far enough, say ¼ of the duct width. Once the fuel is out in the stream, the fuel and air mix so all of the surrounding air gets fuel. The manner of mixing depends on the space between the fuel plumes. The term "gap" is commonly used in the art to mean the distance between the fuel injection plumes. It is frequently used to describe the relative distance the fuel travels before it mixes adequately with the air (burning is substantially instantaneous after mixing). However, has been found that using conventional sonic injectors separated by gap of "G", the fuel enters the supersonic air stream and turns parallel to the air stream, and a distance of perhaps 60 times G is required to achieve significant mixing. This leads to the desire for more closely spaced injectors to reduce the required combustor length. However, adding more injector sites (closer together) would result in extra fuel being injected which reduces engine efficiency due to the incomplete combustion. Reducing the fuel flow to the desired level (by reducing feed pressure or injector orifice size) reduces the fuel penetration and leaves air near the center of the combustor without sufficient fuel for combustion.

One object of the present invention is to provide the engine designer with fuel injectors that penetrate relatively better than prior art fuel injectors so that the designer can use a large number of injectors (reduced mixing gap) without wasting fuel or starving the center of the duct. FIG. 1 illustrates the desired result, comparing fuel plumes from conventional sonic injectors (FIGS. 1a and 1b) with fuel plumes from injectors according to the present invention (FIGS. 1c and 1d). In all four views of FIG. 1, "I" represents the respective injector. FIGS. 1a and 1b show that with seven sonic injectors producing fuel plumes separated by a mixing gap G requires a combustor length roughly equal to 60 G, while the improved injector with the same penetration requirement provides more injection sites (here 15, for example) producing a mixing gap of g, requiring a reduced combustor length of 60 g, where g<G.

One primary improvement in the presently claimed fuel injectors is the increased relative penetration of the fuel jet. When fuel is injected into a cross flowing air stream, an aerodynamic interaction occurs that deflects the fuel plume until it becomes parallel with the air stream. The point where the fuel plume becomes parallel to the duct wall is the point of maximum penetration. The distance the fuel jet penetrates is determined by the trajectory of the fuel jet. The trajectory is determined by two competing factors. The first factor is the momentum of the fuel jet normal to the air stream. This momentum can be expressed variously as $\rho_j V_j^2 \sin \theta_j$ where $\rho_j$ is the fuel jet density, $V_j$ is the jet velocity, and $\theta_j$ is the injection angle. The opposing factor is the drag force imposed on the fuel jet by the air approaching at velocity M. The drag force on this "body" can be computed by the normal form $D = C_D A q_a$ where $C_D$ is the drag coefficient (a function of the shape of the object), A is the projected area of the fuel jet, and $q_a$ is the dynamic pressure of the air computed as $q_a \frac{1}{2} \rho_a V_a^2$. FIG. 2, modified from Billig, F. S., Orth, R. C., Lasky, M., "A Unified Analysis of Gaseous Jet Penetration," American Institute of Aeronautics and Astronautics Journal, Vol. 9, No. 6, June 1971, pp. 1048-1058, illustrates this penetration process. For a given fuel momentum, a narrower or more streamlined fuel jet will experience a lower drag force per unit of travel distance (Y). With less deflecting force acting on the fuel jet, it will travel further into the airstream before its outward motion is arrested. It is an object of this invention to produce a narrow low drag fuel jet that can achieve these and other benefits.

The penetration and mixing of fuel jets in crossflows was extensively studied in the 1960's by Billig and others. Attempts made in this early work were met with limited success. Penetration, as used in the scramjet fuel injector art, is defined as:

$$P = Y/D_j^*$$

where
P = dimensionless penetration
Y = actual penetration
$D_j^*$ = throat diameter of the equivalent sonic injector nozzle Billig et al. showed that penetration is improved roughly 8% when a single supersonic (converging-diverging) as opposed to a single sonic (converging) injector is used with the same fuel flow. Billig, F. S., Orth, R. C., Lasky, M., "A Unified Analysis of Gaseous Jet Penetration," American Institute of Aeronautics and Astronautics Journal, Vol. 9, No. 6, June 1971, pp. 1048-1058. This result can be shown to be the consequence of matching the injector exit pressure to a mean back pressure surrounding the fuel jet. Matching the exit pressure produces the narrowest width jet with the highest momentum. FIGS. 3-5 illustrate fuel jets emerging into a quiescent atmosphere. FIG. 3 shows a sonic injector 10 receiving fuel 12 from a manifold. In FIG. 3, the pressure of the fuel at the exit ($P_e$) exceeds the surrounding value ($P_a$). Since pressure remains that could be used for additional expansion and acceleration of the fuel, this nozzle is referred to as "underexpanded" by those skilled in the art. As the jet emerges from this sonic nozzle, it has the smallest width possible for a circular jet with a given feed pressure and flow rate. Once the gases are released from the confinement of the nozzle, it is free to expand radially outward to width W to relieve the excess pressure. This produces two undesirable effects. The uncontrolled radial expansion produces less increase in the normal jet momentum than an ideal nozzle. A large radial velocity develops that causes the jet to expand beyond the value for an ideally expanded jet. The jet is now over expanded and then collapses back on itself creating a strong system of shocks including a Mach disk, which results in severe shock losses and temperature rise. This flow structure in turn results in a low density jet of significantly greater width and low momentum.

FIG. 4 illustrates a Delaval nozzle with exit pressure $P_a$ matched with the air pressure $P_a$. Expanding the fuel to the prevailing backpressure in the Delaval nozzle produces a supersonic jet with a high velocity and nearly parallel stream lines Since the fuel pressure is matched to the surrounding atmosphere, the fuel jet can maintain its width W for significant distance beyond the injector.

FIG. 5 illustrates an "overexpanded" ($P_e$ less than $P_a$) Delaval nozzle. In this case the fuel is accelerated to an even higher velocity and its stream lines may be near parallel at the exit but the higher surrounding air pressure $P_a$ alters the exhausting flow. Oblique shocks form at the exit that deflect the flow inward on itself As the flow converges on the centerline, additional shocks deflect the gases back parallel and raise the pressure above the surrounding value which starts an explosive re-expansion similar to the flow from the sonic injector exit As in the sonic injector (underexpanded), the overexpanded jet is lower in velocity and wider than the matched pressure jet.

An alternate confirmation of this can be obtained through use of the continuity equation, which relates the fuel mass flow rate, velocity, density and area thus:

$$\dot{m}_j = \rho_j V_j A_j$$

where:
$\dot{m}_j$ = mass flow rate (slugs/sec)
$\rho_j$ = mass density (slugs/ft$^3$)
$V_j$ = flow velocity (ft/sec)
$A_j$ = flow area (ft$^2$) = $\pi/4$ W$^2$
W = jet diameter (width)
The continuity equation can be combined with the ideal gas law and the jet width expressed as a function of pressure and velocity thus:

$$W^2 = \dot{m}_j RT / \pi P_j V_j$$

where:
T = temperature of fuel jet, °R
R = universal gas constant
$P_j$ = fuel jet pressure
In under- and overexpanded flows, the shocks reduce the velocity and raise the fuel temperature, resulting in a wider fuel jet.

When extending this physics to a cross flow situation, the term "effective backpressure" $P_{eb}$ was defined as the average pressure varied around the jet (high on front, medium on the sides, and low on the lee or back side). The early researchers variously used ⅔ or 0.8 times the normal shock pressure to define $P_{eb}$.

Another tactic to improve penetration tried by Billig et al. has been to use non-circular jets for sonic injectors to improve the aerodynamics, i.e., reduce the drag on the fuel jet by producing a narrower jet. FIG. 6 shows a normalized sketch of the fine jet structure deduced from three different shapes, taken from a Johns Hopkins Applied Physics Laboratory Seminar. Although the shape of the injector affected the shape of the fine structure of the underexpanded secondary jet, the use of the non-circular jets did not improve penetration significantly. Although this result was a surprise at the time, the following discussion illustrates one possible reason for this result. The flow of a circular jet into quiescent air was previously discussed. In that case, the backpressure on the emerging flow was uniform around the perimeter of the jet. Consequently, the jet stays circular. In a cross flow, the pressure varies according to position around the jet exit. The same effect can be expected with a non-circular jet. For the case of the oblong jet with its major axis aligned with the airflow (an apparent low drag shape), the pressure will be greatest on the front side of the injector where the air is brought to rest by the blockage produced by the jet. The pressure on the sides of the jet will be close to the free stream value. This creates a highly underexpanded condition for the flow on the sides of this jet. Under these conditions, the fuel jet can be expected to expand much more rapidly to the side making the jet more circular in shape as it moves away from the nozzle. Although Billig and others recognized the benefit of the matched pressure condition, they only applied it in an average sense. Applying the matched pressure condition locally around the perimeter of the non-circular jet will allow it to maintain it's shape further from the nozzle exit.

It was also noted in another study to improve the streamlining of the fuel jet that putting multiple sonic jets in a line parallel to the air flow, as shown in FIGS. 7a and 7b, improved penetration somewhat. In FIG. 7a the penetration of the single sonic injector 32 was compared with the penetration 34 for five sonic injectors arranged in line in the X direction. It was found that with $X/D_j^* = 7.5$ resulted in approximately 20% increase in penetration compared to a single sonic jet having equal fuel flow. Penetration was measured at Billig, F. S., "Penetration and Spreading of Transverse Jets of Hydrogen in a Mach 2.72 Airstream," NASA CR-1794, March 1971.

In supersonic air flow conditions, because the flow of air is very organized it cannot go around the fuel jet easily. The air flow reacts with the obstacle and produces a shock similar to that shown in FIGS. 8a-c when a sonic nozzle is used. Shown in these figures are first and second lobes of jet fuel plume 18 and 20 separated by the Mach disk D. An exterior shock 22 develops along with a boundary layer separation shock 24. The supersonic flow at points away from the wall can tolerate a large change of angle; however, the boundary layer near the wall flows much slower (subsonic) and cannot take the increase in pressure and separates, as shown, so that a recirculation 26 takes place, forming a separation bubble. This recirculation zone creates a very high temperature region 28 on the wall of the combustor. This was also noted by Masyakin, N. E. and Polyanskii, M. N., in their paper, "The Possibility of Blowing a Gas Jet into a Supersonic Flow Without the Formation of a Three Dimensional Boundary-Layer Separation Zone", translated from *Izvestiya Akademii Nauk SSSR, Mekhanika Thadkosti i Gaza,* No. 3, pp. 162-165, May-June 1979. It is a secondary objective of this invention to reduce or eliminate this hot spot.

Other fuel injectors are shown in U.S. Pat. Nos. 3,581,495; 3,699,773; 4,821,512; 4,903,480; and 4,951,463.

Although these efforts are indeed impressive, it would be advantageous if a supersonic fuel injector could produce fuel jets which penetrate further, permitting a larger number of injection sites, and mixes fuel into a supersonic air stream while reducing the loss effects noted above, so that combustors in supersonic vehicles could operate more efficiently with less combustor length than when using known injectors.

SUMMARY OF THE INVENTION

According to the present invention fuel jets may be introduced into sonic and supersonic air streams with increased penetration and increased air/fuel mixing. This is achieved by locally matching the pressure of an aerodynamic fuel jet at the injector nozzle exit with the air stream pressure. The invention lies in a novel fuel injector having at least one fuel inlet port, throat and fuel exit port serially connected and which in combination produce the local pressure match as well as a low drag shape.

In general the invention comprises a scramjet fuel injector of the type mounted flush to the wall of a combustor through which air flows, the injector including a generally elongated body including a surface substantially flush with the wall, the surface having a proximate end and a distal end, the proximate end encountering air into which the fuel is to be injected before the distal end. The fuel injector further includes at least one fuel inlet port connected to the body, at least one fuel exit port in the surface substantially flush with the wall; and at least one throat internal to the body through which fuel serially passes after passing through the inlet ports and before passing through the exit ports. This arrangement of the fuel exit ports and throats combine to create and maintain a substantially streamlined supersonic fuel jet plume shape having exit pressure locally matched with the flowing air.

In one embodiment, the injector includes one fuel exit port including a single elongated tailored slot extending substantially between proximate and distal ends of the injector body surface, the elongated exit slot having width and depth which increase from the proximate end to the distal end of the injector body surface The injector throat includes a progressively increasing width elongated channel internal to the body and centered below the elongated exit slot, the channel thereby forming with the exit slot a continuous series of converging-diverging nozzles of increasing degree of expansion.

In another embodiment, the fuel injector includes a plurality of transverse rectangular fuel exit slots arranged in series flush with the combustor wall. The first of the fuel exit slots is positioned at the proximate end of the injector body surface and the last of the fuel exit slots is positioned at the distal end of the body surface. Each of the exit slots has its transverse dimension increasing from the proximate end to the distal end of the surface. The injector further includes inlet ports and throats serially connected with the exit slots, the throats comprising a plurality of transverse channels having progressively increasing width from the proximate end to the distal end.

A further embodiment of the novel fuel injector includes at least one exit port comprising a three-dimensional contoured surface open to the air flow. The throat comprises a substantially rectangular channel within the injector body, the cross section of the channel being substantially in the Y-Z plane. The throat and inlet fuel port are preferably positioned at a location downstream of the distal end of the injector body surface in reference to the air flow direction, and under the combustor wall, so as to create a counterflow of fuel and air.

The fuel injector described herein has certain advantages over other supersonic and sonic fuel injectors. As there is no part of the injector projecting out into the air stream, cooling of the injector is not a problem. The region of high heat flux to the combustor wall is greatly reduced, and combustors in general can be shorter and lighter than combustors using sonic injectors for a given penetration since more injectors can be employed to reduce the mixing gap.

Further features and advantages of the injectors and methods of injecting fuel into supersonic air streams will become apparent from the description which follows, which, when taken together with the accompanying drawings, illustrate the invention.

BRIEF DESCRIPTION OF THE DRAWINGS

FIGS. 1a-d show a schematic comparison of sonic illustrating a main objective of this invention, reduction in scramjet engine length and weight;

FIG. 2 is a side view schematic of the physical process of a prior art injector;

FIG. 7a shows results of comparing fuel penetration from one sonic injector with the fuel penetration from five sonic injectors arranged serially in the X direction, while

FIGS. 10a-d show side section elevation, distal end section, proximate end section, and plan views of a tailored slot injector in accordance with the present invention;

FIGS. 11a-d show side section elevation, distal end section, proximate end section, and plan views of a cascade supersonic fuel injector in accordance with the present invention;

FIGS. 12a-d show side section elevation, distal end section, proximate end section, and plan views of a supersonic counterflow fuel injector in accordance with the present invention;

FIGS. 13a-d show various dimensions of wedge slot (FIGS. 13a, 13b) and cascade injectors (FIGS. 13c, 13d), with FIGS. 13a and 13b showing plan and distal end sectional views of a wedge injector, respectively, while FIGS. 13c and 13d show plan and side section elevation views of a cascade injector, respectively;

DESCRIPTION OF PREFERRED EMBODIMENTS

Figure 3:
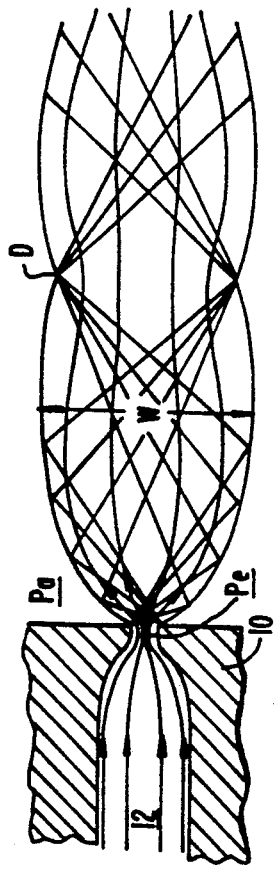
FIG. 3 shows a side section view of a typical sonic (underexpanded) fuel injector injecting fuel into a quiescent medium.
Figure 4:
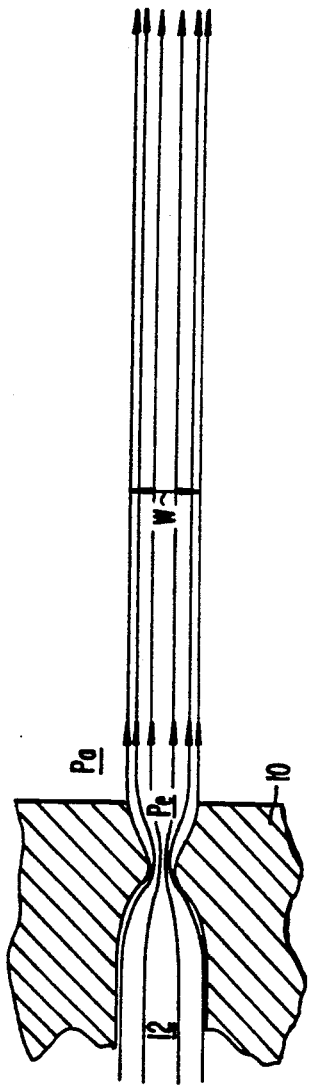
FIG. 4 shows a side section view of a matched-pressure converging-diverging supersonic fuel injector injecting fuel into a quiescent medium.
Figure 5:
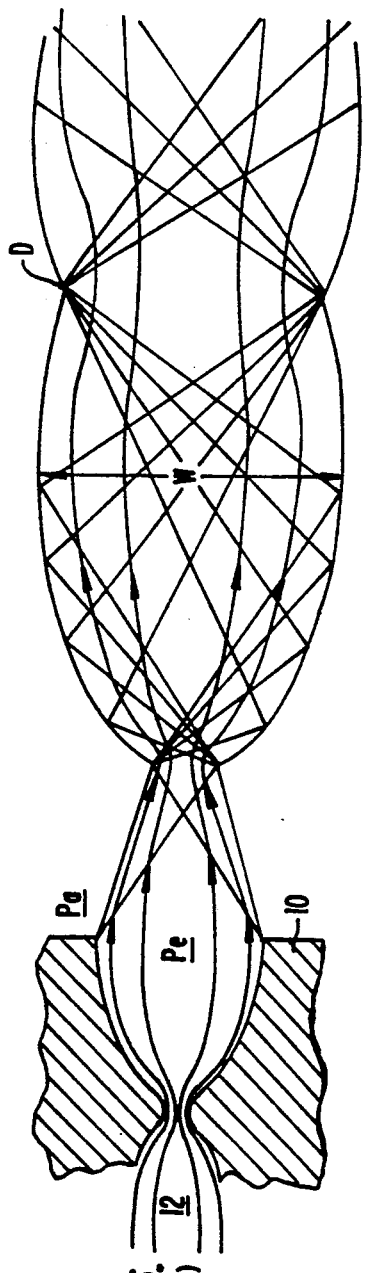
FIG. 5 shows a side section view of an overexpanded fuel plume from a supersonic fuel injector injecting fuel into a quiescent medium.
Figure 6:
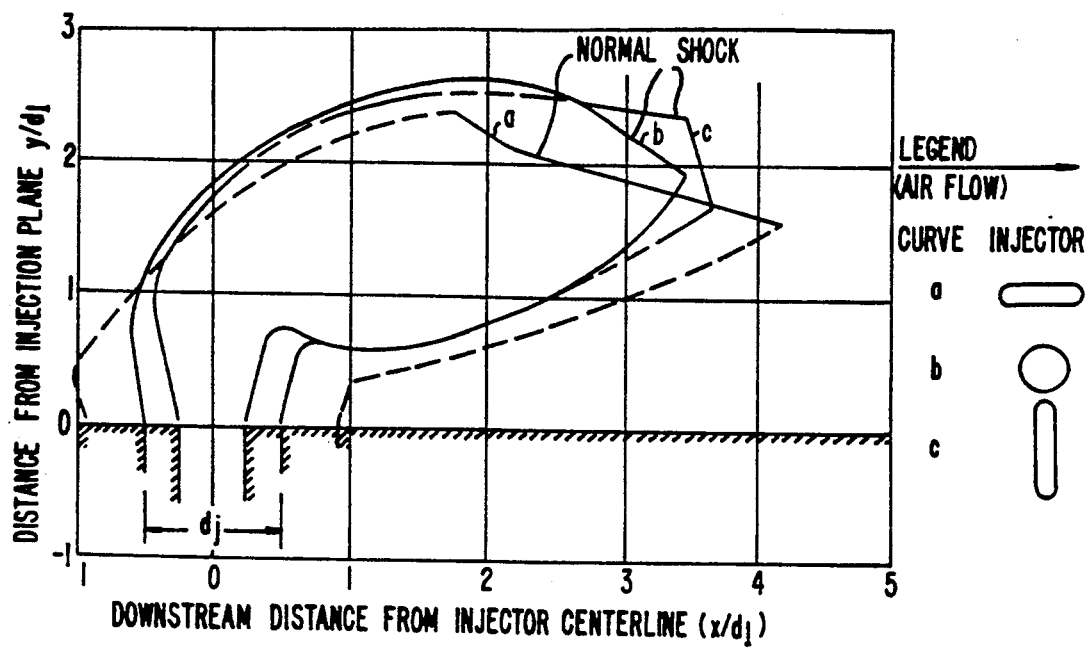
FIG. 6 shows the effect of varying sonic injector nozzle exit shapes on the penetration of fuel into a supersonic air stream.
Figure 7A:
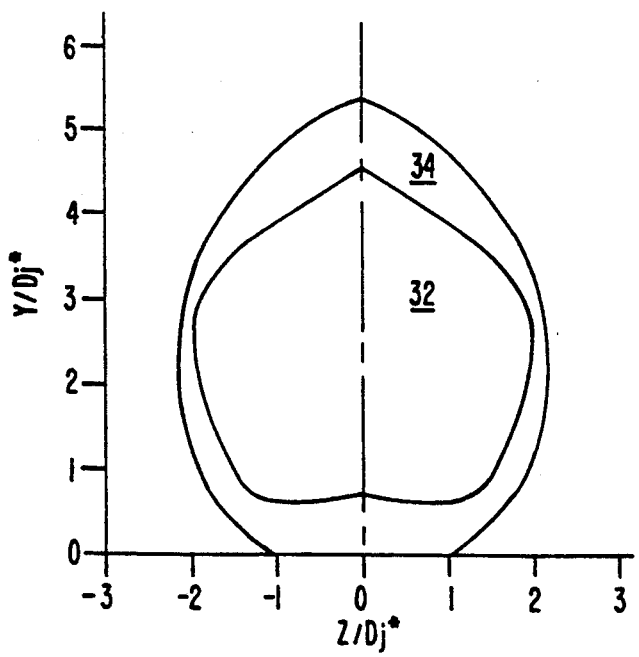
Figure 7B:
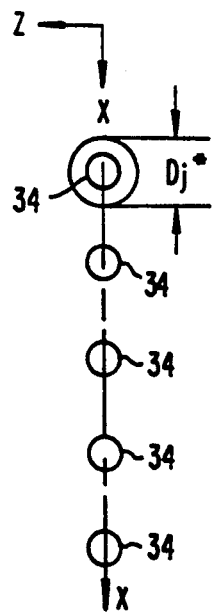
FIG. 7b shows the arrangement of five sonic injectors.

In describing the specific embodiments of the invention, certain terms used herein may be defined to have particular meanings. As a convention herein, the terms "proximate" and "distal" are meant to mean the position furthest upstream in the X direction which the fuel injector body sees and the furthest position downstream in the X direction which the fuel injector sees, respectfully. The term "inlet ports" includes fuel inlet ports having various shapes, lengths, and interior surface contours. The term is meant to include elongated inlet ports having an interior surface with decreasing area to reduce pressure losses in feeding fuel to the injector. The fuel inlet ports may be positioned in various locations. The term "immediately under the combustor wall surface" as used herein means that the inlet port is substantially parallel to and underneath a relatively thin combustor wall so that the inlet port lies substantially between the combustor wall and other engine components, such as electrical components, avionics components, etc. in a commercially acceptable manner. Further, one inlet port may have a series of chambers of same or different sizes arranged in series or in parallel, the dimensions of the various chambers referenced to $D_j^*$, and the same comments apply when using the term "exit ports". The exit ports have preferably smoothly contoured interior surfaces to eliminate or reduce shocks or other loss mechanisms in the expansion of the fuel flow. An improperly shaped interior surface for the injector would produce strong shocks in the flow, thereby reducing fuel injection velocity. One exit port may comprise a series of chambers of the same or different widths, referenced to $D_j^*$. The term "throat" when used herein is meant to mean the minimum area of the fuel injector body through which the fuel passes immediately after the inlet port or ports and immediately preceding the exit port or ports. This is also referred to as a Delaval nozzle in the art. The shape, length, contour, degree of smoothness of interior surface, location and variety of widths and diameters referenced to $D_j^*$ will all be designed to efficiently expand the fuel to the prevailing local pressure at the exhaust site. The nozzle contour shall be designed to produce a fuel jet with nearly parallel stream lines (minimum velocity divergence).

Combustor walls in which the fuel injectors of the present invention may be positioned have generally smooth surfaces but may have surface irregularities or raised portions in which the injectors are positioned flush; i.e., the injector body surface need not be exactly perpendicular to the XY, XZ, or ZY planes, nor must the fuel jet enter the air stream perpendicular to any of these planes. The shape of the wall may vary from rectangular, square, oval, to circular, with all shapes of walls being somewhat dependent on the embodiment or combination of embodiments of fuel injectors used, velocity required of the engine and vehicle, pressure ratio, thrust, etc. The injectors may be arranged in these walls with more than one arrangement being possible, having various mixing gaps. The mixing gap is defined as the distance between respective fuel injection plumes. Although the same or similar embodiments of fuel injectors may be used in one combustor, this is not required and it is possible to use a combination of injector embodiments in one or more combustor walls, so that the overall engine performance and weight can be optimized.

The claimed fuel injectors may be used with great advantage in injecting various types of fuel into flowing airstreams. The main requirement is that the fuel have a high heat content and high cooling capacity. The fuel stream is preferably gaseous. Typical fuels include hydrogen, JP5, methane, propane, methylcyclohexane (MCH), pentaborane, etc. and mixtures of these, with hydrogen being particularly preferable. The terms "sonic" and "supersonic" as used herein are used in their common usage in the art, i.e., sonic generally means a velocity equal to the local velocity of sound in the gas, while "supersonic" as used herein means a velocity greater than the local speed of sound. Supersonic air stream and fuel jet velocities may also be denoted in terms of Mach number relative to their respective speeds of sound, wherein for example Mach 2 means the velocity equivalent to twice the local speed of sound.

Figure 8A:
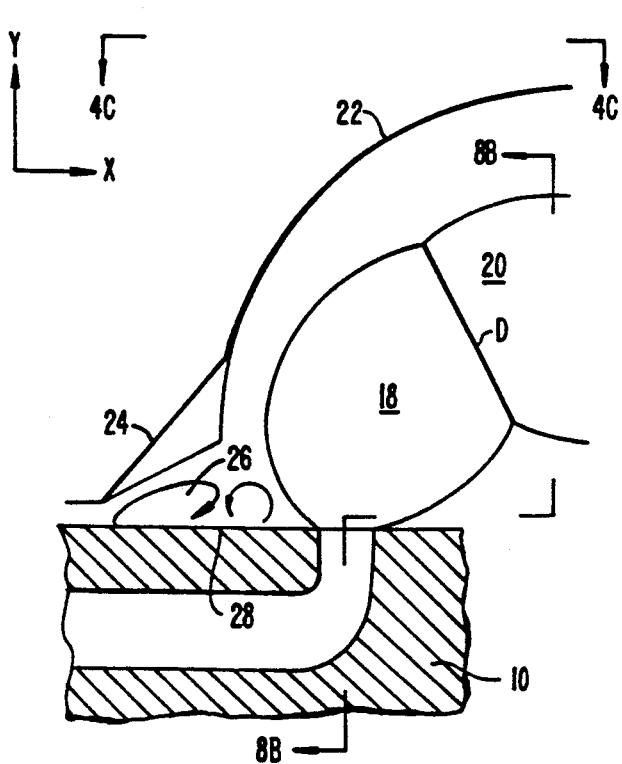
FIGS. 8a-c show side section, end section, and plan views of a sonic injector injecting fuel into a supersonic air stream.
Figure 8B:
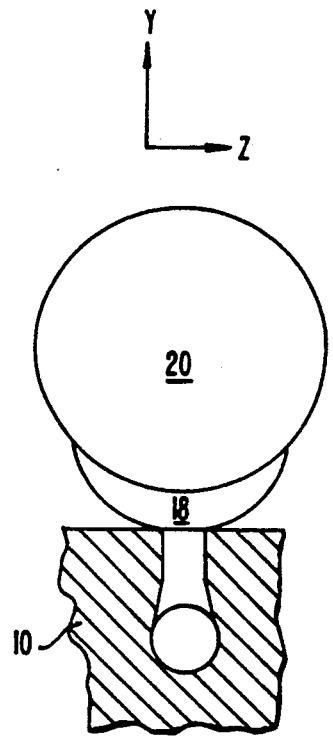
Figure 8C:
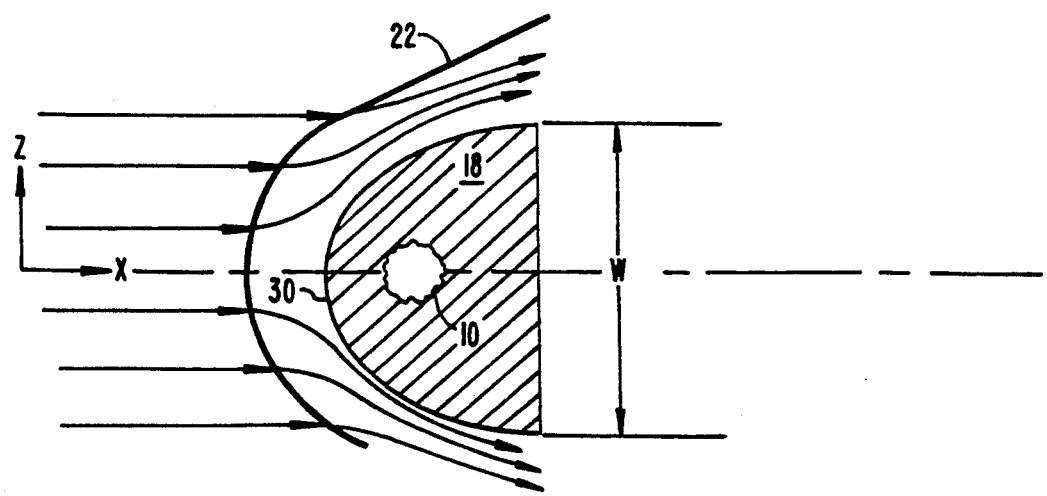
Figure 9A:
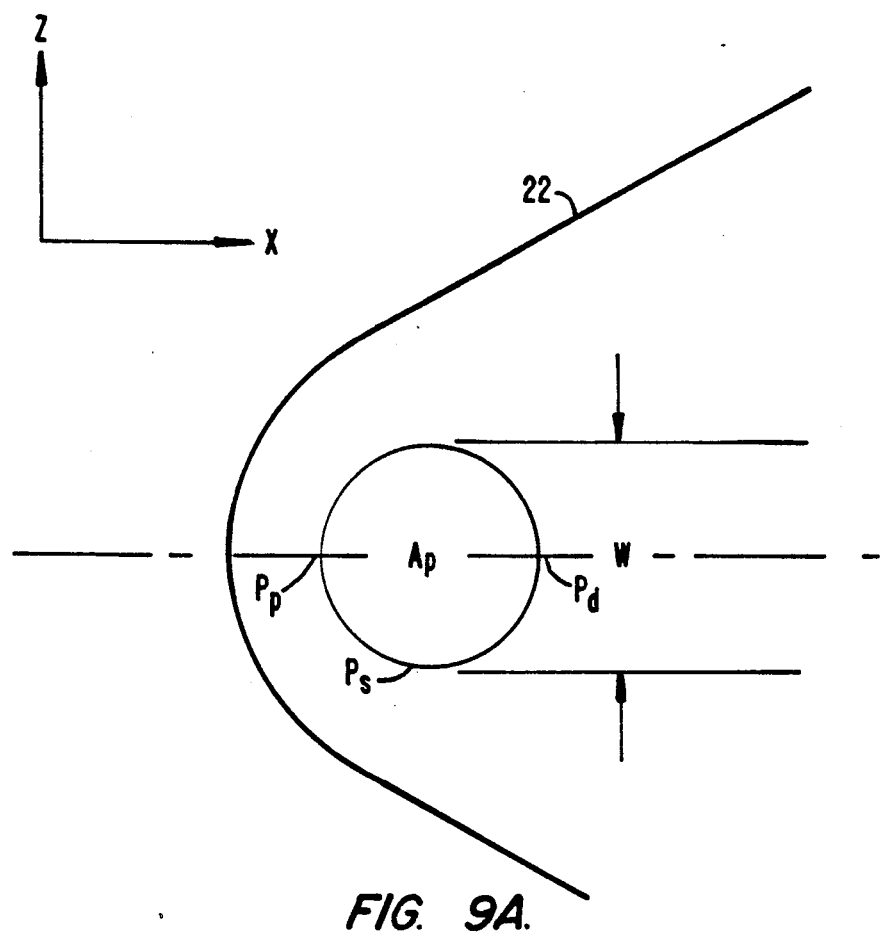
FIGS. 9a and 9b are plan view schematics comparing drag on objects in supersonic flow, the object in FIG. 9a representing the plume emerging from a circular (high drag) injector, and the object in FIG. 9b representing the plume emerging from an elongated (low drag) injector.
Figure 9B:
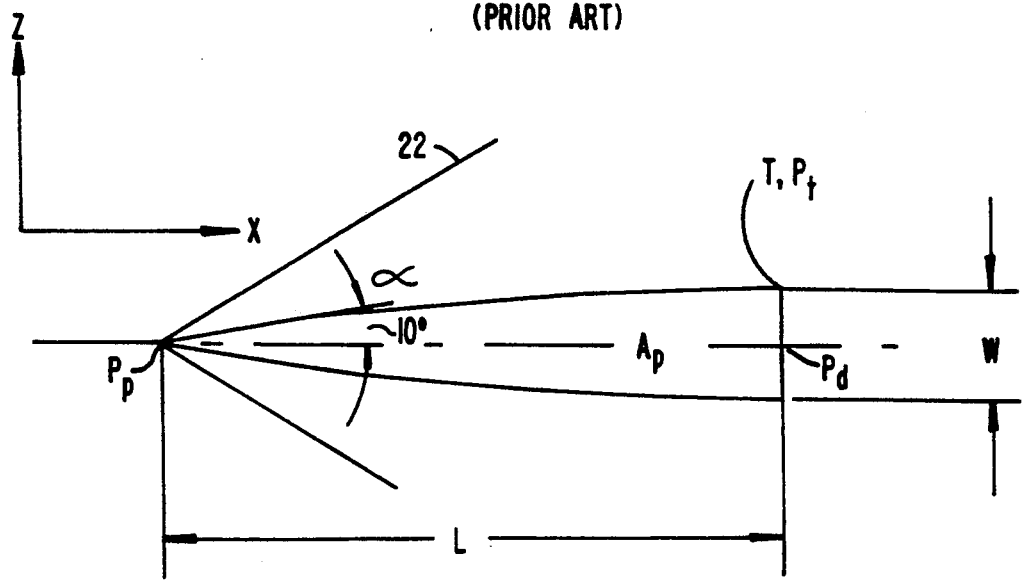

When describing the contour and pressure of the fuel jet entering a sonic or supersonic airstream, various terms are used. When it is stated herein that the fuel jet is "continuous and contoured" it is meant that the fuel jet is basically a continuous stream having a narrow frontal section and not subdivided into discreet lumps or portions in the airstream, and is shaped such that the fuel jet enters the airstream so as not to introduce significantly strong shocks into the engine. The emerging fuel plume can be treated as a body projected into the airstream in order to calculate the pressures surrounding it. It is well known in the literature that drag in a supersonic airstream is lowest when the body is slender with a sharp leading edge and smoothly increasing width. FIGS. 9a and 9b illustrate the drag force on two bodies with the same projected area $A_p$ (i.e., in a plane parallel to the duct wall) of 1.0 in.$^2$ in this example subjected to a supersonic flow. FIG. 9a represents the shape of a sonic circular injection plume as a right circular cylinder. The similarity to FIG. 8c is apparent. In FIGS. 9a and 9b the air approaches the bodies at Mach 4 with a static pressure $P_a$ of 26.5 psia and dynamic pressure $q_a=297$ psia. The blunt shaped body of FIG. 9a generates a strong shock structure 22 and high pressure on the front of the body ($P_p$) of about 503 psia with a pressure on the sides $P_a$ of about 30 psia and pressure ($P_d$) on the distal end of much less than 30 psia. It can be shown that the drag on this body is approximately 300 lbs per inch of projected height, due to a plume width of about 1.13 inches, and drag coefficient $C_D$ of about 1.0. The body shown in FIG. 9b will be recognized as a typical shape for supersonic objects such as projectiles, missles and aircraft. In this example the body has length $L=2.92$ inches and $\alpha=10°$. The sharp leading edge allows the supersonic air to flow by the body with only a small deflection angle and pressure rise. The drag force on the body in FIG. 9b is approximately 17 lb per inch of projected height with a drag coefficient $C_D=0.11$. This is the result of the combined effects of lower pressure exerted on the body ($P_p=66$ psia) and its narrower width ($W=0.51$ inch) due to half angle $\alpha=10°$. The pressure at the tangent point T is $P_T=27$ psia while $P_d=13$ psia. Other shapes may be chosen that produce more or less drag. The exact shape chosen will depend on other design issues such as restrictions on allowable space for the injector. An excessively narrow jet shape (less than 3° half angle $\alpha$) can be expected to suffer greater viscous efects (not included in the above comparison analysis) reducing penetration. Once a jet shape is chosen, such as in FIG. 9b, the pressure around its perimeter is computed such as by the well known shock expansion method.

The internal expansion of the fuel is then calculated such that the fuel emerges at the local backpressure. In this nonlimiting example, the fuel must emerge at the leading edge at $P_p=66.3$ psia. If the fuel is supplied at 1500 psia, the nozzle expansion (area) ratio e would be about 3.12 to 1 giving a fuel Mach number of 2.68 (vertically upward) at the proximate end. At the rear (distal end) of the injector, near tangent T, the local pressure $P_T$ has decreased to 26.6 psia, while the pressure is about $P_d=13$ psia in the wake. If the fuel feed pressure were the same the local nozzle expansion ratio ($\epsilon$) at T would be required to be about 5.52 to 1 to match this local pressure. The local injection Mach number would then be 3.29. The exterior surface of the fuel jet entering the supersonic airstream is thus contoured to produce the minimum drag in contact with the airstream and a local pressure match is achieved between the fuel entering the airstream and the air flowing past the fuel jet plume. The term "local" as used in reference to local pressure match is meant that the pressure at discreet points on the exterior surface of the fuel jet is matched with the pressure existing in the airstream flowing past the fuel jet so that the fuel jet flows out of the injector in substantially parallel stream lines. Where a significant boundary layer exists at the wall, the local flow conditions should be selected intermediate between the freestream and wall conditions to minimize excessive expansion of the jet in the boundary layer due to the boundary layer momentum deficit.

With the above concepts and definitions in mind, the following discussion describes various embodiments of the novel fuel injectors in accordance with the present invention.

Three embodiments of the scramjet supersonic fuel injector are illustrated generally in FIGS. 10, 11 and 12, with each of the figures representing alternate nonlimiting embodiments of the fuel injector. FIG. 10a shows a side section elevation view of a tailored slot fuel injector having a body 36 having a fuel inlet port 38 which receives fuel from a fuel pump or other source, for example, as on a supersonic aircraft. The fuel passes through inlet port 38 and on through an increasing width elongated channel or throat 42 internal to the body, the throat being centered within the elongated exit slot 40. Elongated fuel exit slot 40 extends substantially between the proximate and distal ends of the injector body surface 44. Elongated exit slot 40 has a width and depth which increase from the proximate end to the distal end of the injector body surface. FIG. 10b shows a distal end cross section showing the fuel injector body 36, fuel exit port 40, throat 42 and injector body surface 44, with proximate cross section shown in FIG. 10c. It may be seen by comparing FIG. 10b and 10c that the throat of the injector slowly increases in width while the corresponding exit port increases in width faster from the proximate end of the fuel injector body to the distal end of the fuel injector body. The ratio of the exit width to the throat width determines the local area ratio. The area ratio in turn determines the exit pressure and injection velocity. The exit contour is chosen to produce a low drag plume shape with a known surface pressure. With the local external pressure known, the throat contour is chosen to produce the correct area ratio to achieve the local pressure matching condition in that the fuel jet exiting from the fuel injector from the proximate end (FIG. 10c) is lower in velocity and therefore at a higher pressure while the fuel jet exiting from the injector body near the distal end (FIG. 10b) has a higher velocity and lower local pressure FIG. 10d shows a plan view of the injector showing tailored slot exit 40 and corresponding throat 42.

FIGS. 11a-d show various views of a cascade supersonic fuel injector in accordance with the present invention. The fuel injector body 36 is shown in FIG. 11a includes a series of rectangular fuel exit slots 40 arranged in series and flush with the injector body surface 44. The first of slots 40 is positioned at the proximate end of the injector body surface 44 and the last of the slots 40 is positioned at the distal end of the injector body surface 44. Also shown is a single fuel inlet port 38 which feeds a plurality of throats 42 for each fuel exit port 40. As may be seen with reference to FIGS. 11b and 11c, the fuel inlet port 38 is roughly a constant width channel; however, as with the tailored slot embodiment, the discreet throats 42 and exit ports 40 of the cascade injector combine to produce converging diverging nozzles with various degrees of expansion selected to produce the local pressure match. FIG. 11d shows a representative plan view of the cascade fuel injector shown in FIGS. 11a-c. As can readily be seen rectangular fuel exit slots 40 have their transverse dimension increasing from the proximate end to the distal end of the injector body surface 44. (see also FIG. 13c.) A series of substantially parallel ribs 46 transverse to the air flow are shown connecting opposite sides of the injector surface 44. This embodiment presents the advantage of better packaging than the tailored slot version of the fuel injector in that the fuel inlet port 38 may be rather shallow in depth and receive fuel from a manifold in a manner which saves space in the engine and aircraft.

FIGS. 12a-d show four views of a counterflow supersonic flow injector in accordance with the present invention. FIG. 12a shows a side section elevation showing a single fuel inlet port 38 and throat 42. However, rather than having a tailored exit slot or series of discrete converging diverging nozzles as in the cascade version, this embodiment includes a three dimensionally contoured exit slot 40 which produces a combination of Prandtl-Meyer expansion and compression waves to produce the desired local pressure match and fuel jet contour. As shown in FIG. 12a, the fuel enters in a counterflow fashion from fuel inlet port 38, passing through throat 42 and contoured exit slot 40 into the airstream flowing in the X direction. FIGS. 12b-d show distal end cross section, proximate end cross section, and plan views, respectively, of this embodiment FIGS. 12b and 12c show how the exit port is three dimensionally contoured to produce the upward turn of the fuel into the air stream. The fuel jet is created by turning counterflowing fuel outward by means of a combination Prandtl-Meyer expansion and compression waves in the three-dimensionally contoured nozzle. This embodiment favors some constructions of a combustor and internal accessories for supersonic engines, but is expected to have lower performance of the three embodiments.

Figure 13A:
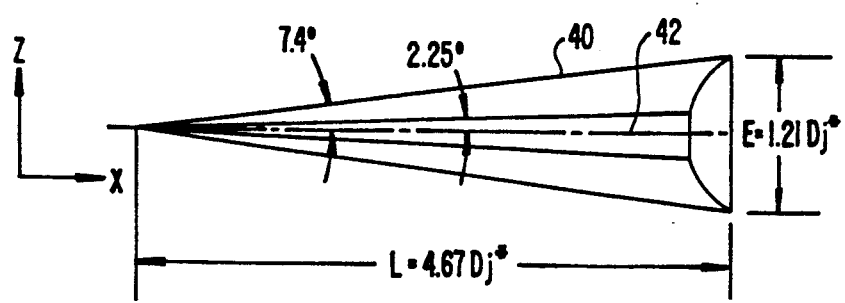
Figure 13B:
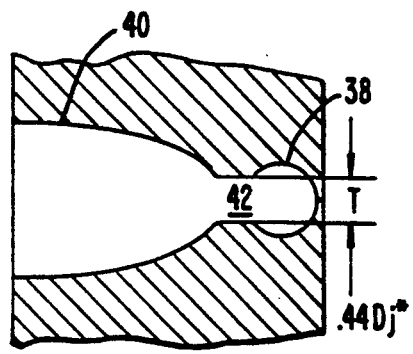

Referring now to FIGS. 13a-d, these figures show typical dimensional details of interest in the various fuel injector embodiments. FIG. 13a shows a wedge embodiment of a tailored slot fuel injector showing a plan view of such an injector. The wedge embodiment is the simplest form of the tailored slot. This configuration provides simpler design and fabrication. These benefits accrue mainly from the constant surface half-angle $\alpha$, which yields a substantially constant pressure along the side of the injector. The matched pressure condition is thus achieved with a fixed expansion ratio $\epsilon$ and order to improve clarity in FIGS. 13a-d). A recommended design procedure for the wedge injector embodiment is as follows. Establish the desired penetration for the injector. Estimate the fuel flow rate needed to achieve the desired penetration with the given air flow and fuel feed conditions. The reference throat area is then calculated:

$$A_t = m_f C^* / g P_i$$

where:
$m_f$ = fuel flow rate, lbs/sec
$g$ = acceleration of gravity, 32.17 ft/sec$^2$
$P_i$ = injection feed pressure, psia
$C^* = (gRT_f/\gamma[2/(\gamma+1)]^{(\gamma+1)/(\gamma-1)})^{\frac{1}{2}}$
$T_f$ = fuel feed temperature, °R
$\gamma$ = ratio of specific heats With the throat area known the diameter of an equivalent circular throat ($D_j^*$) can be easily computed. $D_j^*$ becomes the reference dimension for describing the remaining geometry of the injector even when the throats are non-circular. The next step is choosing the proximate end half-angle $\alpha$. If this angle is greater than about 10°, boundary layer separation may occur leading to excessive heating in front of the jet. This recommendation is consistent with the work of Masyakin and Polyanskii mentioned in the Background of the Invention. If the angle is too small (less than about 3°) the injector becomes excessively long and the viscous effects may reduce the penetration benefits. With the angle chosen (7.4° in FIG. 13a) the local pressure is computed. Since the wedge injector has a substantially constant surrounding pressure along its length, the expansion ratio $\epsilon$ is also substantially constant. In this example, the required exit pressure is 52.8 psia. With a feed pressure of 1500 psia, the expansion ratio $\epsilon$ to drop the pressure to 52.8 psia is about 3.6:1 giving an exit Mach number of 2.83. The exit area is then found from $$A_e = \epsilon A_t = \epsilon \pi D_j^{*2}/4$$

since for the wedge exit area is L×W/2. Solving the geometric equations gives a length of 4.67 $D_j^*$ and a width of 1.21 $D_j^*$.

Figure 13C:
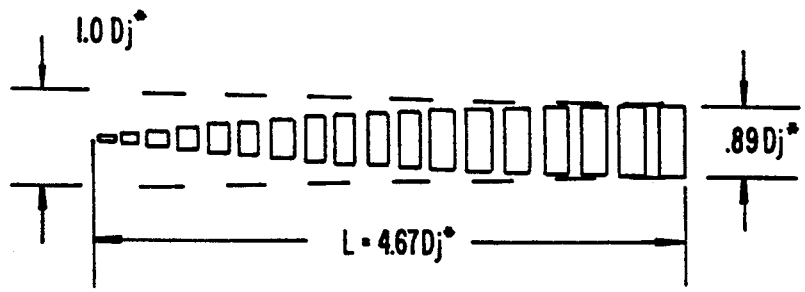
Figure 13D:
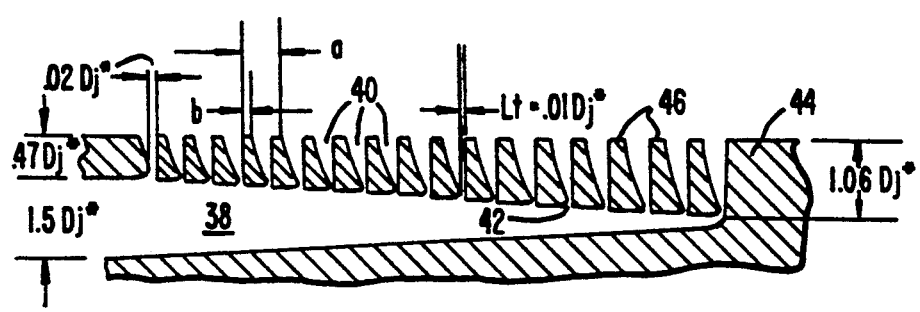
Figure 14:
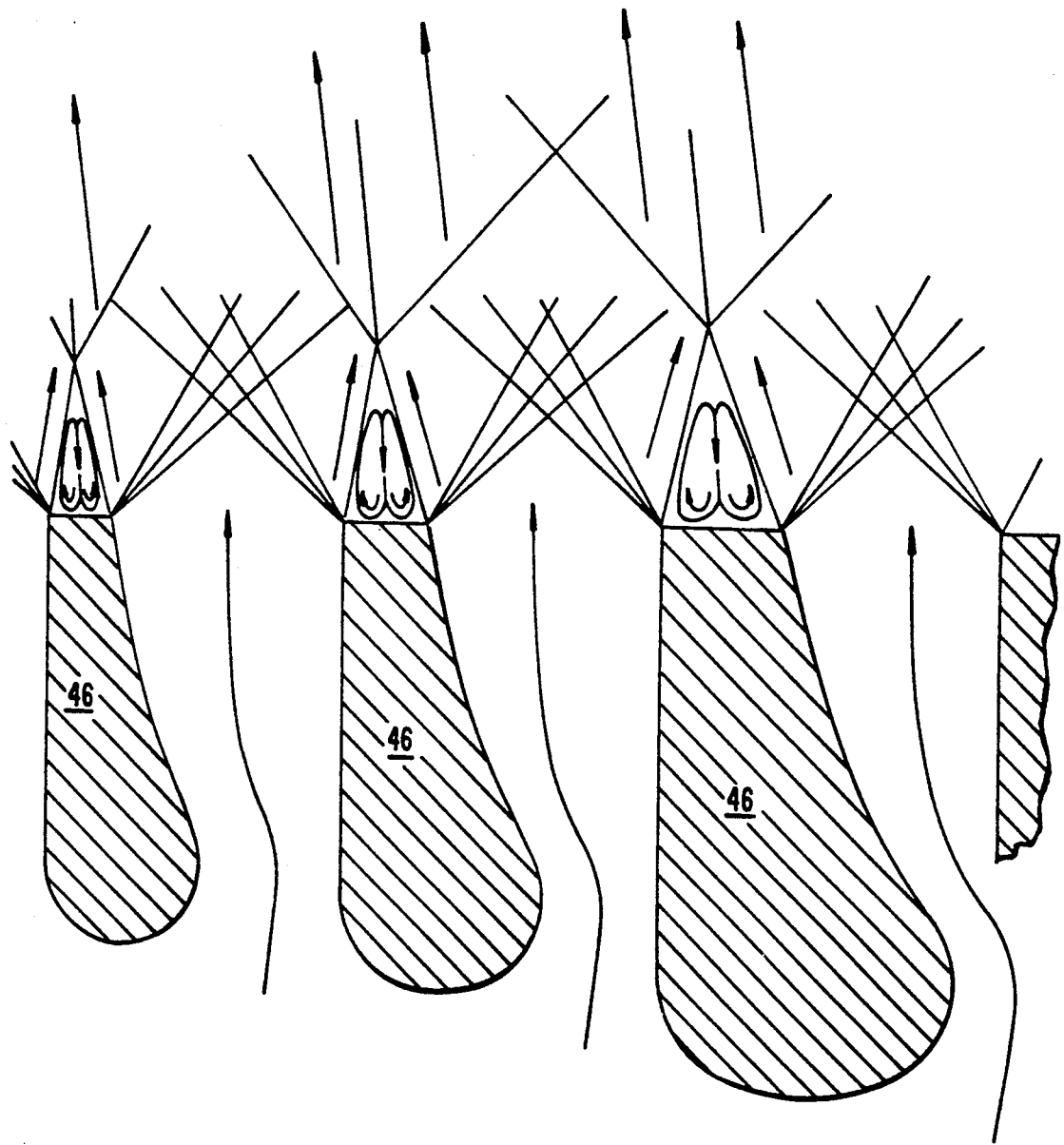
FIG. 14 is a schematic side view of the jet emerging process for the cascade injector.

For the second embodiment (FIG. 13c, cascade), the fuel emerges from a series of discreet injectors arranged within a streamlined contour. This contour can be wedge-like or other low drag shape as dictated by other constraints. In this example, the contoured shape shown in FIG. 9b is used. The above procedure is modified to account for the variable exit pressure from front to rear. This procedure results in an injector 5.12 $D_j^*$ long by 0.89 $D_j^*$ wide. This contour will produce only about half the drag of the wedge contour due largely to the reduced width. The individual nozzles are placed as close together as possible with the minimum rib 46 width as possible to reduce the flow losses when the jets merge as shown in FIG. 14. The individual exits 40 are shown in FIG. 13c as rectangles that begin as narrow as the fabrication technique allows and increases in width to match the desired contour. The area ratio $\epsilon$ of each nozzle is varied to expand the fuel to the local pressure level (after the jets merge). In this example, the throat lengths $L_T$ are kept the same ($L_T = 0.07 D_j^*$) except for the proximate nozzle throat, which must be designed to meet the full stagnation pressure. In this example, $L_T = 0.2 D_j^*$ for the proximate nozzle throat. The use of the same throat length in all but the proximate nozzle allows replicating the same nozzle contour terminating at varying expansion ratios, providing fabrication economies. The main advantage is the shallow depth of initial nozzles which gradually get deeper below the surface as they approach the distal end. This results in a naturally tapered feed manifold close to the surface. A tapered manifold yields lower flow losses and more compact packaging of the injector. Other design approaches can be employed without deviating from the concepts of the invention.

All four embodiments of the novel fuel injector shown in FIGS. 10, 11, 12, and 13 provide increased fuel penetration into the supersonic airstream, more rapid mixing of fuel and air and subsequent combustion of the fuel, reduced engine shock losses as compared with prior art supersonic fuel injectors and sonic fuel injectors, reduced heat load on the combustor or strut walls, and improved packaging.

Figure 15A:
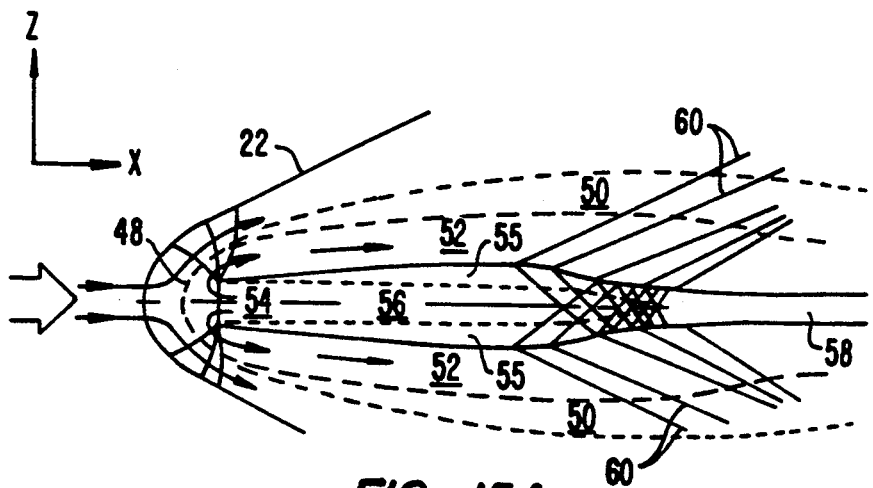
FIG. 15a shows a schematic plan view of the flow field pattern around a streamlined supersonic fuel injector plume emerging from a tailored slot injector.
Figure 15B:
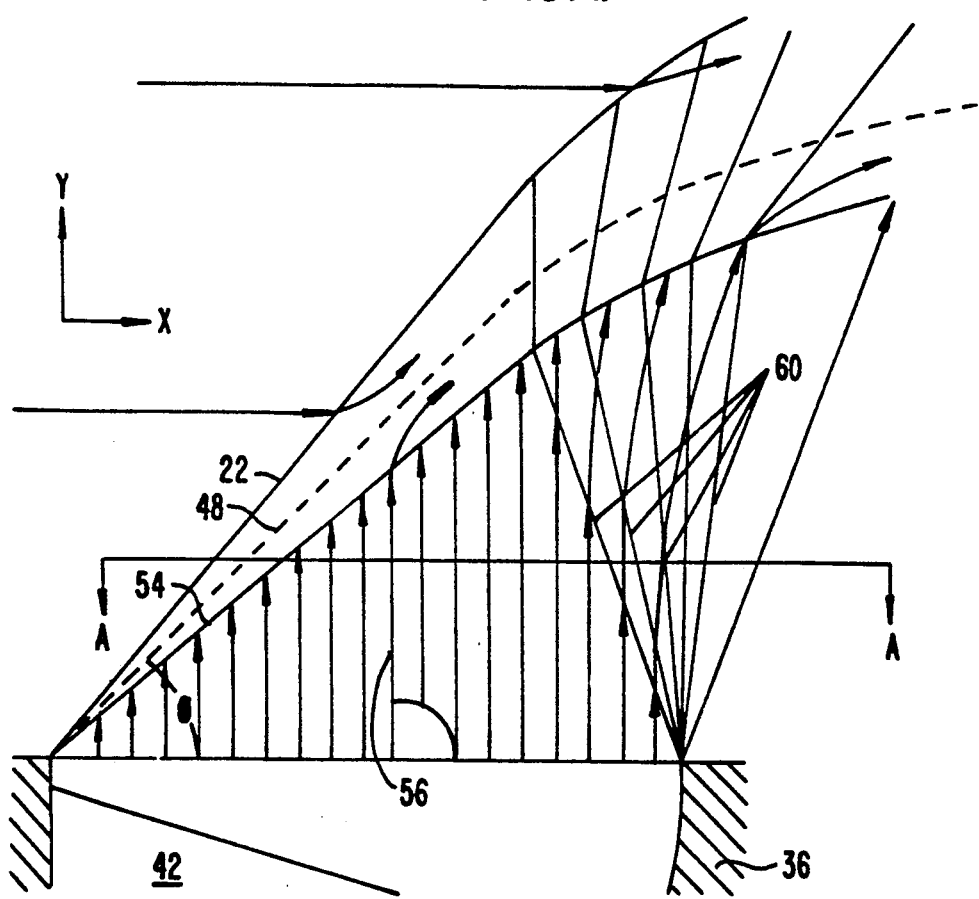
FIG. 15b shows sectioned elevation through the centerline of the plume of FIG. 15a, and FIG. 15c shows a distal end section view of the plume shown in FIGS. 15a and 15b.
Figure 15C:
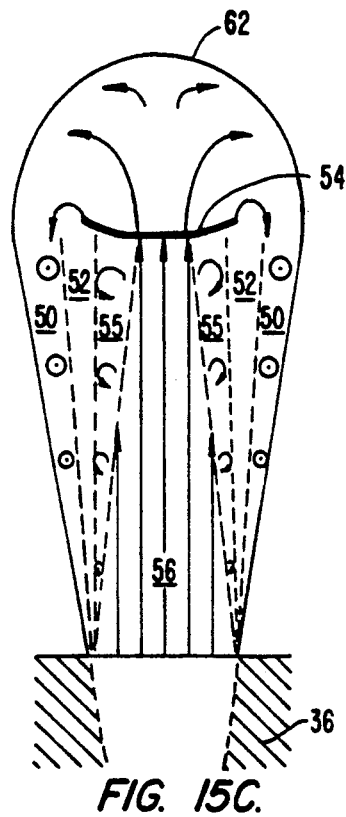

The primary objective of this invention is the creation of a streamlined fuel plume to reduce the drag and increase its penetration into the airstream. The discussions so far have dealt with the shape of the plume as it initially emerges from the duct wall. FIGS. 15a-c show plan, section, and distal end views, respectively, of the flow field of a supersonic fuel jet emitted from an injector in accordance with the present invention. FIG. 15a shows a section through the fuel plume some distance away from the wall. As the fuel moves away from the wall, the leading edge of the plume exposed to the air flow is blunted and eroded. The blunting of the leading edge increases as the pressure at the interface 48 between the air and the fuel increases. The high pressure at the leading edge of the plume is transmitted to the rest of the plume by an interior shock 54 as shown in FIG. 15b, which is a sectional view down the center line of the plume. The fuel that passes through the interior shock 54 is deflected partly toward the downstream (X) direction. The fuel between the interior shock 54 and interface 48 then expands outward due to its high pressure where it is then swept down the sides of the still supersonic core of the plume as shown in FIG. 15a.

The approaching air flow reacts to the fuel plume according to the shape it is deformed into the plume shape approximates a swept blunt fin. Although blunt (i.e. the effective radius increases with increasing distance from the wall), the small mean radius and significant sweep angle (approximately 45°) still results in significantly less drag than the prior art. A shock is formed in the air as it approaches the "fin like" fuel plume. This shock system is referred to as the exterior shock 22 in FIGS. 15a,b. The pressure rise in the air flowing through this exterior shock 22 must match the pressure rise in the fuel passing through the interior shock 54. The angle $\phi$ that interface 48 makes to the duct wall is determined by this pressure compatibility requirement and by the momentum flux ratio between the injected fuel and air flows. The momentum flux of a flow is expressed as $\rho u^2$ (conveniently 2 times the dynamic pressure). The ratio J of the momentum flux of the fuel to the airflow is defined thus:

$$J = [\rho_j(u_j \sin \theta_j)^2]/[\rho_a u_a^2]$$

where:
$u_j$ = velocity of fuel
$u_a$ = velocity of air
$\rho_j$ = density of fuel
$\rho_a$ = density of air
$\theta_j$ = fuel jet injection angle The higher the momentum flux ratio J, the closer interface 48 angle $\phi$ approaches the fuel jet injection angle $\theta_j$. When $J = 1.0$ and $\theta_j = 90°$ it can be shown that the interface angle $\phi$ is approximately 45°. The interior and exterior shocks 54 and 22 will diverge slightly from the angle of the interface due to the increasing radius of the leading edge.

The penetration of the fuel can be estimated geometrically from the path of the interior shock 54. When this shock reaches the distal end of the fuel plume it has "processed" all of the fuel. Although the fuel still has vertical velocity after being processed by the interior shock it is rapidly swept downstream by the high pressure air downstream of the exterior shock 22. This analysis predicts the penetration to be only slightly more than the length of the injector (when $J = 1.0$, $\theta_j = 90°$).

Taken by itself, the above discussion would lead one to believe that maximum penetration would be achieved with the maximum injector length (X direction). The limitation on the previous discussion is that it assumes that the viscous mixing zone has not reached the center of the jet core. FIG. 15c shows a transverse section through the plume near the distal end of the injector. Four discreet flow regions can be identified within the plume. In the center is the inviscid core 56. The core flow is supersonic with its velocity vector unaffected by the presence of the outer flow zones (moving normal to the wall). Surrounding the core is fuel 52 that has passed through the interior shock and been swept down the outsides of the core by the airflow. This fuel is moving substantially in the direction of the air (90° to the core). A viscous fuel/fuel mixing zone 55 develops between fuel flow 52 and the core fuel 56. On the outside of the fuel plume, a fuel/air mixing zone 50 develops (the ultimate objective of the fuel injector). These mixing zones spead (get thicker) in the direction of the flows. The spreading angle will vary with the flow parameters but typically is about 6°. Until the inner mixing zone 55 reaches the center line, the center line core velocity remains unchanged. If the inner mixing zone 55 reaches the center of the core before the core passes through the interior shock, the core momentum is reduced which reduces the penetration for a given injector length, offseting the benefit of the low injector half angle ($\alpha$). The flow field at the distal end is also effected by the proximity to the low pressure wake zone 58 behind the jet (FIG. 15a). The various oblique lines 60 shown in FIG. 15a and 15b represent an expansion region wherein the fuel jet experiences expansion toward the wake region.

Although the supersonic fuel plume may vary from the particular shape shown in FIGS. 15a-c, such as for example that produced by the cascade or counterflow embodiments, this schematic is deemed to be representative of all embodiments of the fuel plume. For example, the fuel plume may extend to a greater extent in the Y direction than as shown in FIG. 15c, or extend less in the Z direction as in FIG. 15a, depending on the velocity of the airstream flowing past the injector, the degree of pressure behind the fuel plume, etc. The shape of supersonic fuel plume may also be affected by the spacing between respective fuel injectors. More densely spaced fuel injectors, common in various combustor configurations, may cause the supersonic fuel plumes to interact through their exterior shocks, whereas fuel injectors separated by a sufficiently will produce individual supersonic fuel plumes probably not interact to a great degree. Of the course, the optimum gap should be provided so that optimal combustor length and weight may be obtained with the supersonic fuel jets. In all instances the mixing gap will be less for the improved injectors than over prior art injectors, leading to a greater number of injection sites for the same penetration requirement, consequently reducing combustor length and therefore the overall weight of the engine, as shown in FIG. 1.

Figure 16:
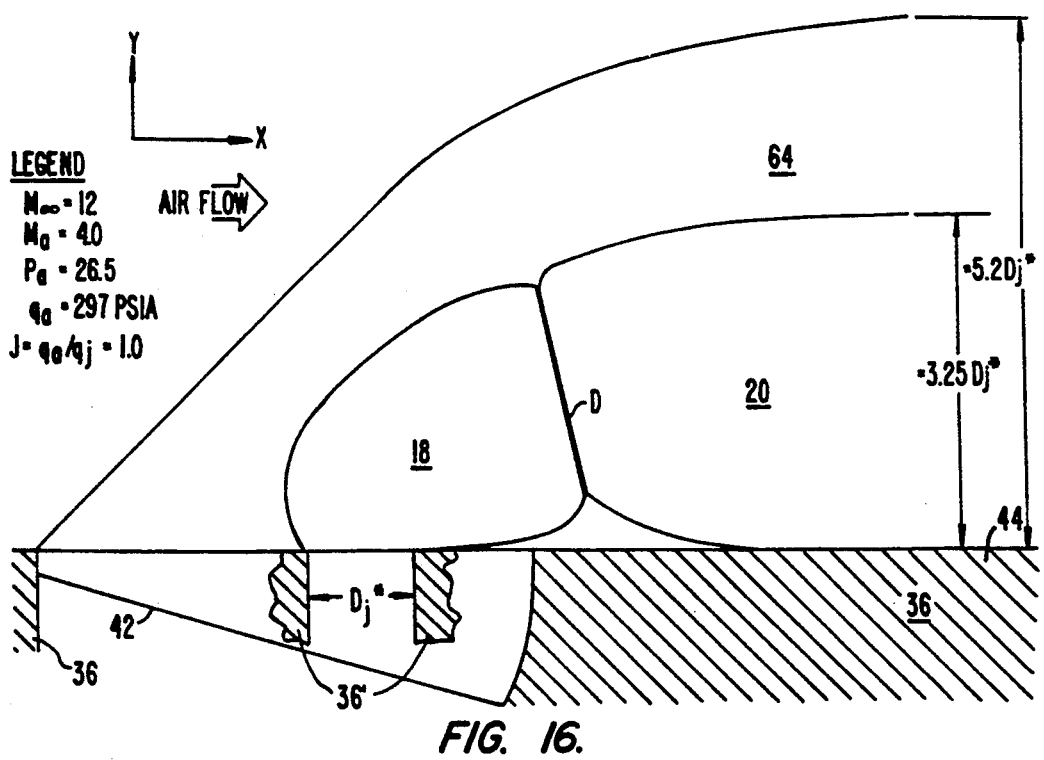
FIG. 16 compares the predicted penetration from a single sonic fuel injector to that achieved with a single tailored slot supersonic fuel injector in accordance with the present invention showing the sonic fuel injector cross section superimposed on the wedge injector cross section.

FIG. 16 indicates a schematic representation comparing a sonic fuel injector with a supersonic fuel injector in accordance with the present invention. The figure compares the penetration predicted by this method for a wedge injector 36 relative to a single sonic fuel injector 36' superimposed thereon. Airflow conditions are indicated in the legend. The first and second fuel lobes 18 and 20 of the sonically injected fuel plume are shown, with a Mach disk D. As can be seen in FIG. 16, the penetration in the Y direction (air flow proceeding in the X direction) is roughly equivalent to 3.25 $D_j^*$ for the sonic injector. In contrast, the fuel plume from the wedge injector, represented in cross section as 64, has a relative penetration in the Y direction of about 5.2 $D_j^*$, as a particularly preferable degree of penetration. The penetration may vary in the wedge injector from about 4.5 $D_j^*$; to about 6.5 $D_j^*$ depending on the detailed design. What is important to note in reference to FIG. 16 is the relative improvement in penetration by the supersonic fuel jet with reference to the single sonic fuel jet. The degree of predicted increase can be substantial, ranging from about 50 percent to more than 100 percent improvement over that of the single sonic jet. The improvement in penetration is also predicted to be over that of prior art circular supersonic jet exit contours, as previously discussed, and over multiple sonic jets arranged axially with the air flow.

Also shown in FIG. 16 is the relatively contoured shape of the supersonic fuel jet produced from injectors in accordance with the present invention when compared with that of the profile of the sonic fuel jet. This contoured shape allows the supersonic fuel jet to penetrate much further into the airstream as discussed above, as a result of the local pressure match. The legend indicates that the Mach number of the airstream immediately upstream in the X direction of the fuel jet has a Mach number of about 4, an absolute pressure of 26.5 psia and dynamic pressure $q_a$ of 297 psia. The momentum ratio (J) is 1.0 in FIG. 16. Preferably, J ranges from about 0.5 to about 2.0. A low J ($<0.5$) produces the undesirable condition that the airstream dynamic pressure is greater than the local dynamic pressure of the fuel jet, causing the fuel jet 64 to penetrate less than that shown in FIG. 16, while a J much greater than 1.0 leads to greater penetration than in FIG. 16 but requires higher fuel injector pressure and generates stronger shocks in the air flow.

Figure 17:
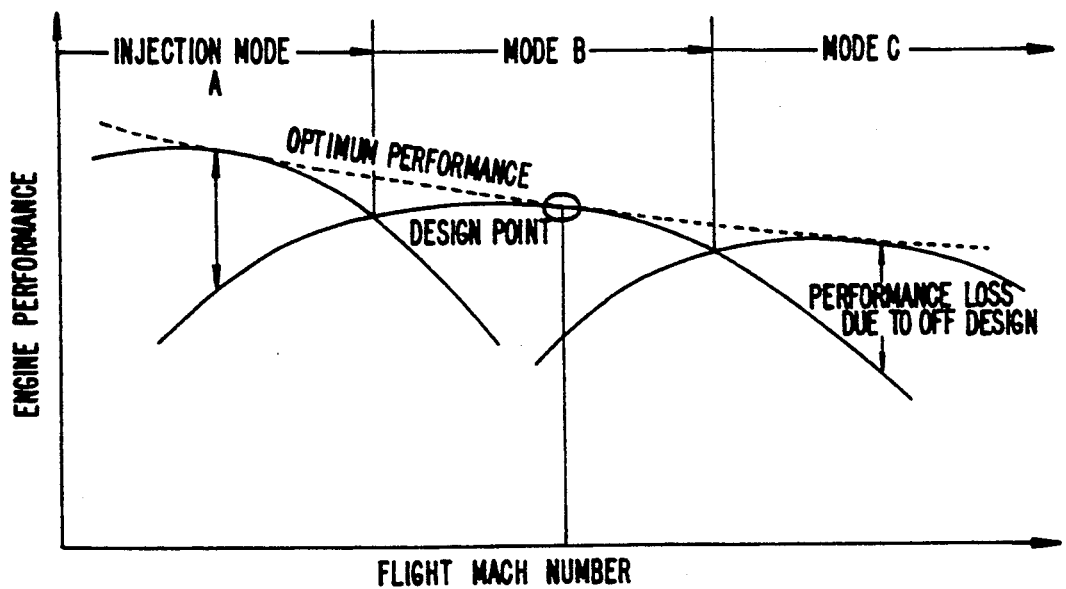
FIG. 17 is a plot of engine performance versus flight Mach number, illustrating the benefits of multimode injection.

In the previous discussions the design approach was discussed that will result in the optimum engine performance at a single point. At this condition, referred to as the "design point", the injector meets all requirements for fuel flow and penetration as well as meeting the matched pressure condition. If the engine were intended to operate only at this condition, the designer's job would be finished. In most applications, however, the engine must operate over a range of flight conditions. When the engine is operating away from the design point, this is commonly referred to as operating "off-design". During off-design operation, the fuel flow and penetration requirements may change in an incompatible way that will degrade engine performance. In most systems of this sort, performance degrades slowly as one initially moves away from the design point. The rate of degradation increases the further away from the design point the engine operates. By feeding the injector fuel through two or more manifolds, the designer can create two or more design points. FIG. 17 illustrates this effect, with modes A, B, and C representing three different operating modes possible using multiple injector feed manifolds. The single feed injector average performance is reduced compared with the multiple feed embodiment.

Figure 18:
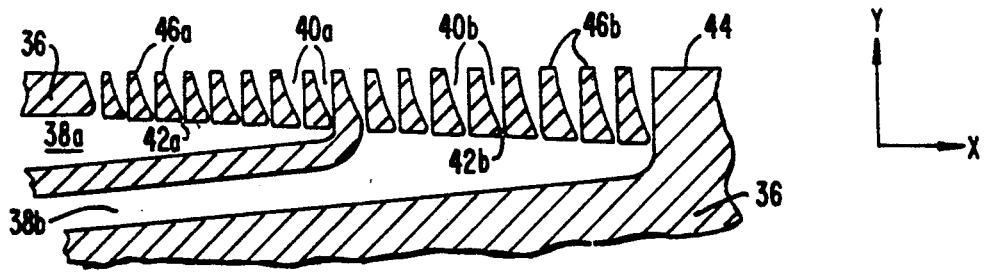
FIG. 18 shows an alternate embodiment of a cascade type supersonic fuel injector.
Figure 19:
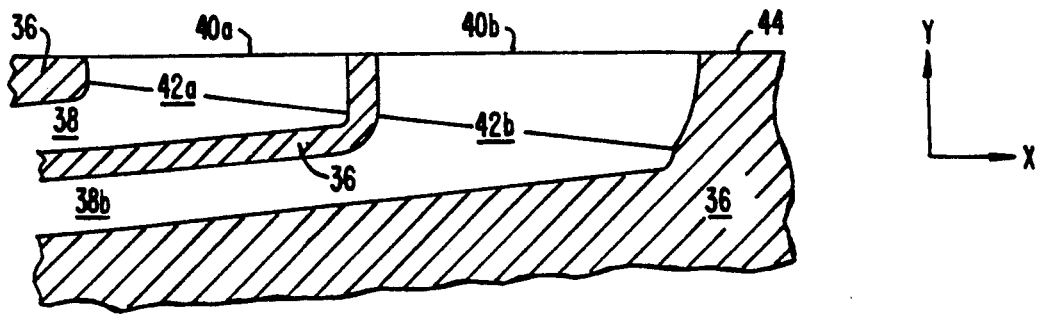
FIG. 19 shows an alternate embodiment of a tailored slot supersonic fuel injector.

FIGS. 18 and 19 represent alternative embodiments of cascade and tailored slot fuel injectors, respectively, utilizing multimode fuel injection. FIG. 18 shows an injector body 36 having a surface 44 exposed to the air flow, as in the previous embodiments. However, in the embodiment shown in FIG. 18, dual fuel inlet ports 38a and 38b are shown. This produces a situation where one set of exit slots 40a receive fuel from one inlet port 38a and another set of fuel exit slots 40b receives fuel via inlet port 38b. This embodiment allows optimization of engine performance by adding an additional variable. For example, at higher flight Mach numbers, less fuel is needed for combustion. The reduced fuel flow requirement can be met by feeding only the proximate manifold with a higher pressure. The effective injector length is shorter but the higher feed pressure (higher J) keeps the fuel penetration at the required value without wasting fuel. The optimum number of modes or stages of fuel injection chosen will be determined by the tradeoff between engine performance gain and the weight increase due to the added valving and manifolds. Three stages may represent the practical limit, but more stages may be possible, as the injectors claimed herein are not limited to three mode injection.

FIG. 19 shows an alternate embodiment of the tailored slot injector wherein two inlet ports 38a and 38b are shown where the fuel passes through dual throats 42a and 42b and out dual exit ports 40a and 40b. As with the embodiment shown in FIG. 18, this embodiment is merely representative of a tailored slot injector having 38a, 38b, . . . 38n separate fuel inlet ports and 40a, 40b, . . . 40n tailored exit slots. Similar constraints on the embodiment of FIG. 19 are present as with the constraints mentioned with respect to the alternate cascade embodiment of FIG. 18.

The materials used for the fuel injectors described herein are generally metallic, but all construction materials that can be adapted for high temperature operation would be suitable. Examples include alloys of rhenium and molybdenum.

Although the foregoing invention has been described in detail, for purposes of clarity of understanding, it will be obvious that certain modifications may be practiced within the scope of the appended claims. For example, combinations of tailored slot, cascade, and counterflow embodiments may be combined into a single or a plurality of hybrid fuel injectors for a particular engine. The optimum combustor length and weight may be determined by these various combinations of the different embodiments.

What is claimed is:

1. A fuel injector mounted flush to the wall of a combustor through which air flows at a predetermined air pressure in a direction defined as the air flow direction, said fuel injector comprising:
   a generally elongated body including a surface substantially flush with said wall, said surface having a proximate end and a distal end aligned with said air flow direction such that said air flow direction extends from said proximate end to said distal end;
   at least one fuel inlet port connected to said generally elongated body;
   a single elongated exit slot having a longitudinal axis parallel to said air flow direction, said elongated exit slot having an exit slot cross section perpendicular to said longitudinal axis, said exit slot cross section having a width parallel to said surface and a depth perpendicular to said surface, said width and depth increasing in said air flow direction; and
   at least one throat in said generally elongated body communicating said at least one fuel inlet port with said single elongated exit slot,
wherein said single elongated exit slot and said at least one throat are configured to create and maintain a substantially streamlined supersonic fuel jet plume shape having a local exit pressure substantially equal to said predetermined air pressure.

2. A fuel injector in accordance with claim 1 wherein said at least one fuel inlet port is comprised of a single elongated fuel inlet port having a longitudinal axis parallel to said air flow direction, and said at least one throat is comprised of a single passage elongated in said air flow direction and communicating said single fuel inlet port with said single elongated exit slot, the width of said passage increasing in said air flow direction, said combined elongated fuel inlet port, elongated passage and elongated exit slot defining a nozzle having a nozzle cross section perpendicular to said flow direction, said nozzle cross section shaped as a convergent-divergent nozzle with a degree of expansion increasing in said air flow direction.

3. A fuel injector in accordance with claim 1 in which said exit slot cross section is wedge-shaped.

4. A fuel injector mounted flush to the wall of a combustor through which air flows at a predetermined air pressure in a direction defined as the air flow direction, said wall being parallel to said air flow direction, said fuel injector comprising:
  a generally elongated body including a surface substantially flush with said wall, said surface having a proximate end and a distal end aligned with said air flow direction such that said air flow direction extends from said proximate end to said distal end;
  at least one fuel inlet port connected to said generally elongated body;
  a plurality of fuel exit ports comprising openings in said wall aligned in said air flow direction, each said opening having a width perpendicular to said air flow direction and parallel to said surface, the widths of successive openings increasing in said air flow direction; and
  a plurality of throats in said generally elongated body communicating said at least one fuel inlet port with said plurality of fuel exit ports, one of said plurality of throats for each of said plurality of fuel exit ports, each combination of throat and fuel exit port defining a convergent-divergent nozzle; and
wherein said plurality of fuel exit ports and said plurality of throats are configured to create and maintain a substantially streamlined supersonic fuel jet plume shape having a local exit pressure substantially equal to said predetermined air pressure.

5. A fuel injector in accordance with claim 4 in which each of said plurality of fuel exit ports comprises a rectangular-shaped slot in said surface, each said rectangular-shaped slot having a width perpendicular to said air flow direction and a length parallel to said air flow direction, the width of each of said rectangular-shaped slots exceeding the length thereof, and each of said plurality of throats also being rectangular in shape and having a width perpendicular to, and a length parallel to, said air flow direction, the widths of said throats being substantially equal and the lengths of said throats increasing in said air flow direction.

6. A fuel injector in accordance with claim 5 in which said plurality of fuel exit ports comprises 5 to 25 of said rectangular-shaped slots.

7. A fuel injector in accordance with claim 5 in which said at least one fuel inlet port is comprised of a common feed passage for all said throats and fuel exit ports.

8. A fuel injector in accordance with claim 5 in which said at least one fuel inlet port comprises a single flow passage substantially parallel to said surface fed from a location upstream, relative to said air flow direction, of said proximate end of said generally elongated body.

9. A fuel injector mounted flush to the wall of a combustor through which air flows at a predetermined air pressure in a direction defined as the air flow direction, said fuel injector comprising:
  a generally elongated body including a surface substantially flush with said wall, said surface having a proximate end and a distal end aligned with said air flow direction such that said air flow direction extends from said proximate end to said distal end;
  a single trough elongated in said flow direction;
  a single flow passage opening into said trough and connected to said generally elongated body, said flow passage being substantially parallel to said surface and located downstream of said trough relative to said air flow direction; and
  a single throat in said generally elongated body communicating said flow passage with said trough, said throat defining a plane perpendicular to said air direction and substantially rectangular in shape;
wherein said at least one fuel exit port and said at least one throat are configured to create and maintain a substantially streamlined supersonic fuel jet plume shape having a local exit pressure substantially equal to said predetermined air pressure.

* * * * *

UNITED STATES PATENT AND TRADEMARK OFFICE
CERTIFICATE OF CORRECTION

PATENT NO. : 5,220,787
DATED : Jun. 22, 1993
INVENTOR(S) : Bulman

It is certified that error appears in the above-identified patent and that said Letters Patent is hereby corrected as shown below:

In column 2, line 39, delete "$q_a \frac{1}{2} \rho_a V_a^2$" and substitute therefor, --$q_a = \frac{1}{2} \rho_a V_a^2$--;

In column 3, line 32, delete "$P_a$" and substitute therefor, --$P_e$--;

In column 4, line 58, after "Penetration was measured at", insert --the 60% concentration point. Wagner, J.P., Cameron, J.M.,--;

In column 6, line 41, after "comparison of sonic", insert --injection (FIGs. 1a, 1b) and low drag injection (FIGs. 1c, 1d),--;

In column 9, line 50, delete "ratio e" and substitute therefor, --ratio $\epsilon$--;

In column 11, line 48, after "ratio $\epsilon$ and", insert --injection Mach number. (Many of the details are deleted in--; and In column 14, line 47, delete "sufficiently will produce" and substitute therefor, --sufficiently greater gap will produce--.

Signed and Sealed this

Eighth Day of March, 1994

Attest:

BRUCE LEHMAN

*Attesting Officer*  *Commissioner of Patents and Trademarks*